United States Patent
Sato et al.

(10) Patent No.: US 9,995,001 B2
(45) Date of Patent: Jun. 12, 2018

(54) ACRYLAMIDE-BASED POLYMER, PAPER STRENGTH AGENT, AND PAPER

(71) Applicant: HARIMA CHEMICALS, INCORPORATED, Kakogawa-shi, Hyogo (JP)

(72) Inventors: Hirotaka Sato, Hyogo (JP); Tadaaki Horii, Hyogo (JP); Takanori Kurihara, Hyogo (JP); Takahiro Fujiwara, Hyogo (JP); Kazushige Inaoka, Hyogo (JP)

(73) Assignee: HARIMA CHEMICALS, INCORPORATED, Kakogawa-Shi, Hyogo (JP)

( * ) Notice: Subject to any disclaimer, the term of this patent is extended or adjusted under 35 U.S.C. 154(b) by 0 days. days.

(21) Appl. No.: 15/114,492

(22) PCT Filed: Oct. 28, 2015

(86) PCT No.: PCT/JP2015/080431
§ 371 (c)(1),
(2) Date: Jul. 27, 2016

(87) PCT Pub. No.: WO2016/092965
PCT Pub. Date: Jun. 16, 2016

(65) Prior Publication Data
US 2016/0340831 A1 Nov. 24, 2016

(30) Foreign Application Priority Data

Dec. 8, 2014 (JP) .................................. 2014-248433

(51) Int. Cl.
*D21H 27/10* (2006.01)
*D21H 17/37* (2006.01)
*C08F 220/56* (2006.01)
*D21H 21/18* (2006.01)

(52) U.S. Cl.
CPC ......... *D21H 17/375* (2013.01); *C08F 220/56* (2013.01); *D21H 17/37* (2013.01); *D21H 21/18* (2013.01); *D21H 27/10* (2013.01)

(58) Field of Classification Search
CPC .... C08F 220/06; C08F 220/34; C08F 220/56; C08F 228/02; D21H 27/10; D21H 17/37; D21H 17/375; D21H 21/18
USPC ....................................................... 162/168.3
See application file for complete search history.

(56) References Cited

U.S. PATENT DOCUMENTS 7,482,417 B2    1/2009  Kiyosada et al.

FOREIGN PATENT DOCUMENTS

| CN | 102627724 A | 8/2012 |
|---|---|---|
| EP | 0 282 081 A1 | 9/1988 |
| JP | 64-61596 A | 3/1989 |
| JP | 10-46489 A | 2/1998 |
| JP | 2000-008293 A | 1/2000 |
| JP | 2000-239326 A | 9/2000 |
| JP | 2002-317393 A | 10/2002 |
| JP | 2004-84121 A | 3/2004 |
| JP | 2008-179910 A | 8/2008 |
| JP | 2009-24125 A | 2/2009 |
| JP | 2011-246830 A | 12/2011 |

OTHER PUBLICATIONS

PCT International Preliminary Report on Patentability (IPRP) and Written Opinion dated Jun. 22, 2017, in corresponding International Application No. PCT/JP2015/080431 (14 pages).
International Search Report (PCT/ISA/210) dated Dec. 8, 2015, by the Japanese Patent Office as the International Searching Authority for International Application No. PCT/JP2015/080431.
Written Opinion (PCT/ISA/237) dated Dec. 8, 2015, by the Japanese Patent Office as the International Searching Authority for International Application No. PCT/JP2015/080431.

*Primary Examiner* — Mark Halpern
(74) *Attorney, Agent, or Firm* — Buchanan, Ingersoll & Rooney PC

(57) ABSTRACT

The acrylamide-based polymer is produced by polymerizing a polymer component including (meth)acrylamide, a quaternary ammonium-based monomer, and (meth)allylsulfonic acid salt, but not including either a crosslinkable monomer containing nitrogen or a tertiary amino-based monomer.

8 Claims, No Drawings

US 9,995,001 B2

ACRYLAMIDE-BASED POLYMER, PAPER STRENGTH AGENT, AND PAPER

This application is a 371 of PCT/JP2015/080431 filed 28 Oct. 2015.

TECHNICAL FIELD

The present invention relates to an acrylamide-based polymer, a paper strength agent, and paper. In particular, the present invention relates to an acrylamide-based polymer, a paper strength agent containing the acrylamide-based polymer, and paper produced by using the paper strength agent.

BACKGROUND ART

Conventionally, in the field of paper making, various papermaking chemicals such as the following have been known: for example, agents for retention and drainage for improvement in retention and drainage of raw material pulp and/or filler so that operability and working efficiency can be improved; and for example, a paper strength agent for improvement in strength of paper products.

For such papermaking chemicals, a paper strength agent composed of an aqueous solution of an acrylamide-based polymer has been known, and to be specific, Patent Document 1 below has proposed, for example, that a paper strength agent is produced as an aqueous solution of an amphoteric polyacrylamide by introducing acrylamide, dimethylaminoethylmethacrylate, a quaternary compound of dimethylaminoethylmethacrylate, itaconic acid, sodium methallylsulfate, methylenebisacrylamide (polyfunctional vinyl monomer), and ion-exchange water, and adding a polymerization initiator (ammonium persulfate) to be reacted.

CITATION LIST

Patent Document

Patent Document 1
Japanese Unexamined Patent Publication No. 2008-179910

SUMMARY OF THE INVENTION

Problem to be Solved by the Invention

Meanwhile, when the paper strength agent described in the above-described Patent Document 1 is used, the produced paper product may contain (meth)acrylamide. (Meth)acrylamide is not only unfavorable to human body, but also is regulated by Food and Drug Administration (FDA). Therefore, when the paper product is used in, for example, food wrapping, reduction in the (meth)acrylamide content in the paper product is demanded.

An object of the present invention is to provide an acrylamide-based polymer that allows for excellent increase in paper strength and reduction in the (meth)acrylamide content, and a paper strength agent containing the acrylamide-based polymer.

Means for Solving the Problem

The present invention [1] includes an acrylamide-based polymer, wherein the acrylamide-based polymer is a polymer of a polymer component, and the polymer component contains (meth)acrylamide, a quaternary ammonium-based monomer, and (meth)allylsulfonic acid salt, but does not contain either a crosslinkable monomer containing nitrogen or a tertiary amino-based monomer.

The present invention [2] includes the acrylamide-based polymer of the above-described [1], wherein the polymer component substantially consists of (meth)acrylamide, a quaternary ammonium-based monomer, and (meth)allylsulfonic acid salt.

The present invention [3] includes the acrylamide-based polymer of the above-described [1], wherein the polymer component further contains an anionic polymerizable monomer.

The present invention [4] includes the acrylamide-based polymer of the above-described [3], wherein the polymer component substantially consists of (meth)acrylamide, a quaternary ammonium-based monomer, (meth)allylsulfonic acid salt, and an anionic polymerizable monomer.

The present invention [5] includes the acrylamide-based polymer of the above-described [1] or [3], wherein the polymer component further contains another polymerizable monomer.

The present invention [6] includes the acrylamide-based polymer of any one of the above-described [1] to [5], wherein the quaternary ammonium-based monomer includes a quaternary compound of dialkylaminoalkyl (meth)acrylamide.

The present invention [7] includes the acrylamide-based polymer of any one of the above-described [1] to [6], wherein the quaternary ammonium-based monomer includes a quaternary compound of a diallyl amine derivative monomer.

The present invention [8] includes the acrylamide-based polymer of the above-described [7], wherein the quaternary compound of a diallyl amine derivative monomer is diallyldimethylammoniumchloride.

The present invention [9] includes a paper strength agent containing the acrylamide-based polymer of any one of the above-described [1] to [8].

The present invention [10] includes the paper strength agent of the above-described [9], wherein the paper strength agent is used for food wrapping paper.

The present invention [11] includes paper produced by using the paper strength agent of the above-described [9].

Effect of the Invention

When the acrylamide-based polymer, and the paper strength agent containing the acrylamide-based polymer of the present invention are used for production of paper, paper strength can be increased excellently, and the (meth)acrylamide content in the produced paper product can be reduced.

The paper of the present invention is produced by using the paper strength agent of the present invention, and therefore paper strength is increased, and the (meth)acrylamide content is reduced.

DESCRIPTION OF EMBODIMENTS

The acrylamide-based polymer of the present invention is produced by polymerization of a polymer component including (meth)acrylamide, a quaternary ammonium-based monomer, and (meth)allylsulfonic acid salt, but not including either a crosslinkable monomer containing nitrogen or a tertiary amino-based monomer.

Examples of the (meth)acrylamide include acrylamide and methacrylamide. The (meth)acryl is defined as acryl and/or methacryl (the same applies to the following).

The (meth)acrylamide can be used singly, or can be used in combination of two or more. That is, only one of the acrylamide and methacrylamide can be used, or both of these can be used in combination. Preferably, acrylamide is used singly.

The (meth)acrylamide content relative to the total mol of the polymer component is, for example, 50 mol % or more, preferably 60 mol % or more, and for example, 99 mol % or less, preferably 97 mol % or less.

The quaternary ammonium-based monomer is a cationic copolymerizable monomer having a quaternary ammonium group and an ethylenic double bond, and examples thereof include a quaternary compound (hereinafter referred to as a quaternary compound of tertiary amino-based monomer) in which the tertiary amino group of the polymerizable monomer having a tertiary amino group is quaternized, and for example, a quaternary compound (hereinafter referred to as a quaternary compound of diallyl amine derivative monomer) in which the tertiary amino group of the diallyl amine derivative monomer is quaternized.

Examples of the polymerizable monomer having a tertiary amino group include (meth)acrylate derivative having a tertiary amino group and (meth)acrylamide derivative having a tertiary amino group.

Examples of the (meth)acrylate derivative having a tertiary amino group include dialkylaminoethyl (meth)acrylate (e.g., dimethylaminoethyl (meth)acrylate, etc.) and dialkylaminopropyl (meth)acrylate. Examples of the (meth)acrylamide derivative having a tertiary amino group include dialkylaminoalkyl (meth)acrylamide (e.g., dialkylaminopropyl (meth)acrylamide (e.g., dimethylaminopropylacrylamide, etc.) and (meth)acrylamide-3-methylbutyldimethylamine, etc.).

Examples of the quaternary compound of a tertiary amino-based monomer include a quaternary compound (quaternized salt) in which the tertiary amino group of the above-described polymerizable monomer having a tertiary amino group is quaternized with methyl chloride, methyl bromide, benzyl chloride, benzyl bromide, dimethyl sulfate, and epichlorohydrin.

Examples of the quaternary compound of a diallyl amine derivative monomer include diallyldimethylammonium chloride, diallyldimethylammonium bromide, diallyldiethylammonium chloride, diallyldibutylammonium chloride, and diallylmethylethylammoniumchloride.

These quaternary ammonium-based monomers may be used singly or in combination of two or more.

For the quaternary ammonium-based monomer, preferably, a quaternary compound of dialkylaminoalkyl (meth)acrylamide and a quaternary compound of a diallyl amine derivative monomer are used, and more preferably, a quaternary compound of a diallyl amine derivative monomer is used.

For the quaternary compound of dialkylaminoalkyl (meth)acrylamide, preferably, a quaternary compound of dimethylaminopropylacrylamide is used. Preferably, a quaternary compound with methyl chloride or benzyl chloride is used.

For the quaternary compound of a diallyl amine derivative monomer, preferably, diallyl dimethyl ammonium chloride is used.

The quaternary ammonium-based monomer content relative to a total mol of the polymer component is, for example, 0.01 mol % or more, preferably 0.1 mol % or more, and for example, 30 mol % or less, preferably 15 mol % or less.

(Meth) allylsulfonic acid salt is a copolymerizable monomer that works as a chain transfer agent as well, and (meth)allyl is defined as allyl and/or methallyl.

For the (meth)allylsulfonic acid salt, to be specific, for example, sodium allylsulfonate, sodium methallylsulfonate, potassium allylsulfonate, and potassium methallylsulfonate are used.

These (meth)allylsulfonic acid salts may be used singly or in combination of two or more.

For the (meth)allylsulfonic acid salt, preferably, sodium methallylsulfonate is used.

The (meth)allylsulfonic acid salt content relative to a total mol of the polymer component is, for example, 0.01 mol % or more, preferably 0.2 mol % or more, and for example, 5 mol % or less, preferably 3 mol % or less.

The polymer component preferably consists of (meth)acrylamide, a quaternary ammonium-based monomer, and (meth)allylsulfonic acid salt.

The crosslinkable monomer containing nitrogen is a crosslinkable monomer containing one or more nitrogen atom in one molecule, and examples thereof include a crosslinkable monomer containing an amide group and a crosslinkable monomer containing an imide group.

Examples of the crosslinkable monomer containing an amide group include methylenebis (meth)acrylamide, ethylenebis (meth)acrylamide, allyl (meth)acrylamide, N-substituted acrylamide-based monomer (e.g., N,N'-dimethylacrylamide, diacetoneacrylamide, isopropylacrylamide), and triacrylformal.

For the crosslinkable monomer containing an imide group, for example, diacryloylimide is used.

The tertiary amino-based monomer is a polymerizable monomer having a tertiary amino group (non-quaternary compound), and examples thereof include (meth)acrylate derivative having a tertiary amino group (e.g., dialkylaminoethyl (meth)acrylate (e.g., dimethylaminoethyl (meth)acrylate, etc.), dialkylaminopropyl (meth)acrylate, etc.), (meth)acrylamide derivative having a tertiary amino group (e.g., dialkylaminoethyl (meth)acrylamide, dialkylaminopropyl (meth)acrylamide (e.g., dimethylaminopropylacrylamide, etc.), and (meth)acrylamide-3-methylbutyldimethylamine, etc.).

When the polymer component contains (meth)allylsulfonic acid salt but does not contain these crosslinkable monomer containing nitrogen and tertiary amino-based monomer, and when the produced acrylamide-based polymer is used for production of paper, paper strength can be increased excellently and (meth)acrylamide content in the paper product can be reduced.

The polymer component can further contain an anionic polymerizable monomer.

The polymer component preferably consists of (meth)acrylamide, a quaternary ammonium-based monomer, (meth)allylsulfonic acid salt, and an anionic polymerizable monomer.

For the anionic polymerizable monomer, for example, an organic acid-based monomer such as α,β-unsaturated carboxylic acid and a sulfonic acid-based monomer having a vinyl group is used.

Examples of the α,β-unsaturated carboxylic acid include α,β-unsaturated monocarboxylic acid-based monomer such as acrylic acid, methacrylic acid, and crotonic acid; and α,β-unsaturated dicarboxylic acid-based monomer such as maleic acid, fumaric acid, itaconic acid, and citraconic acid.

For the sulfonic acid-based monomer having a vinyl group, for example, vinylsulfonic acid, styrenesulfonic acid, and 2-acrylamide-2-methylpropane sulfonic acid are used.

For the anionic copolymerizable monomer, salts such as sodium salt, potassium salt, and ammonium salt of the above-described organic acid-based monomer can also be used.

These anionic polymerizable monomers may be used singly or in combination of two or more.

For the anionic polymerizable monomer, preferably, an organic acid-based monomer, more preferably, α,β-unsaturated carboxylic acid, even more preferably, itaconic acid and acrylic acid are used.

The anionic polymerizable monomer content relative to a total mol of the polymer component is, for example, 0.1 mol % or more, preferably 0.5 mol % or more, and for example, 20 mol % or less, preferably 10 mol % or less.

When the polymer component contains the anionic polymerizable monomer, and when the acrylamide-based polymer produced from the polymer component is used for production of paper, paper strength can be increased and the (meth)acrylamide content in the paper product can be decreased more excellently.

The polymer component can also contain another polymerizable monomer (polymerizable monomer excluding the (meth)acrylamide, quaternary ammonium-based monomer, (meth)allylsulfonic acid salt, crosslinkable monomer containing nitrogen, tertiary amino-based monomer, and anionic polymerizable monomer).

Examples of another polymerizable monomer include nonionic copolymerizable monomers such as alkyl (meth)acrylate, hydroxyalkyl (meth)acrylate, diacetoneacrylamide, styrene, α-methylstyrene, polyalkyleneglycol (meth)acrylate, glycerol mono(meth)acrylate, vinylpyrrolidone, vinyloxazoline, vinyl acetate, acryloylmorpholine, and acrylonitrile, and preferably, alkyl (meth)acrylate and hydroxyalkyl (meth)acrylate are used.

Examples of the alkyl (meth)acrylate include a straight chain, branched, or cyclic alkyl (meth)acrylate monomer having 1 to 30 carbon atoms such as methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, pentyl (meth)acrylate, neopentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, dodecyl (meth)acrylate, tridecyl (meth)acrylate, tetradecyl (meth)acrylate, 1-methyltridecyl (meth)acrylate, hexadecyl (meth)acrylate, octadecyl (meth)acrylate (stearyl (meth)acrylate), isostearyl (meth)acrylate, eicosyl (meth)acrylate, docosyl (meth)acrylate (behenyl (meth)acrylate), tetracosyl (meth)acrylate, triacontyl (meth)acrylate, and cyclohexyl (meth)acrylate.

The nonionic copolymerizable monomer content relative to a total mol of the polymer component is, for example, 0.1 mol % or more, preferably 1 mol % or more, and for example, 20 mol % or less, preferably 10 mol % or less.

Examples of another copolymerizable monomer also include a crosslinkable monomer containing no nitrogen.

The crosslinkable monomer containing no nitrogen is a crosslinkable monomer having no nitrogen atom in one molecule, and for example, a crosslinkable monomer containing neither amide group nor imide group is used.

To be more specific, examples of the crosslinkable monomer containing no nitrogen include a nitrogen-noncontaining difunctional cross-linking agent (e.g., divinylbenzene, ethylene glycoldi(meth)acrylate, diethylene glycol di(meth)acrylate, triethylene glycoldi(meth)acrylate, allyl (meth)acrylate, etc.), and a nitrogen-noncontaining polyfunctional cross-linking agent (e.g., triacrylic acid pentaerythritol, trimethylolpropaneacrylate, tetraallyloxyethane, etc.).

These crosslinkable monomers containing no nitrogen may be used singly or in combination of two or more.

The crosslinkable monomer containing no nitrogen content relative to a total mol of the polymer component is, for example, 0.001 mol % or more, preferably 0.01 mol % or more, and for example, 10 mol % or less, preferably 5 mol % or less.

The other polymerizable monomer may be used singly or in combination of two or more.

When the polymer component contains the other polymerizable monomer, and when the acrylamide-based polymer produced from the polymer component is used for production of paper, paper strength can be increased and the (meth)acrylamide content in the paper product can be decreased more excellently.

To copolymerize these polymer components, for example, a predetermined reaction vessel is charged with the polymer component, polymerization initiator, and solvent, and allowed them to react. In this method, the polymer components can be introduced all at once, or can be introduced dividedly in a plurality of times. The reaction can also be progressed by dropping a part of or all of the polymerization initiator in the reaction vessel.

Examples of the polymerization initiator include a radical polymerization initiator, and to be specific, peroxide-based compounds, sulfides, sulfines, and sulfinic acids, and even more preferably, a peroxide-based compound can be used. The peroxide-based compound can be used as a redox-based polymerization initiator in combination with a reducing agent.

For the peroxide-based compound, for example, organic peroxide and inorganic peroxide can be used, and preferably, inorganic peroxide can be used.

Examples of the organic peroxide include benzoyl peroxide, lauroyl peroxide, acetyl peroxide, caprylyl peroxide, 2,4-dichlorobenzoyl peroxide, isobutylperoxide, acetylcyclohexylsulfonylperoxide, t-butylperoxy pivalate, t-butylperoxy-2-ethylhexanoate, 1,1-di-t-butylperoxycyclohexane, 1,1-di-t-butylperoxy-3,3,5-trimethylcyclohexane, 1,1-di-t-hexylperoxy-3,3,5-trimethylcyclohexane, isopropylperoxydicarbonate, isobutylperoxydicarbonate, s-butylperoxydicarbonate, n-butylperoxydicarbonate, 2-ethylhexylperoxydicarbonate, bis(4-t-butylcyclohexyl)peroxydicarbonate, t-amylperoxy-2-ethylhexanoate, 1,1,3,3-tetramethylbutylperoxy-ethylhexanoate, 1,1,2-trimethylpropylperoxy-2-ethylhexanoate, t-butylperoxyisopropylmonocarbonate, t-amylperoxyisopropylmonocarbonate, t-butylperoxy-2-ethylhexylcarbonate, t-butylperoxyallylcarbonate, t-butylperoxyisopropylcarbonate, 1,1,3,3-tetramethylbutylperoxyisopropylmonocarbonate, 1,1,2-trimethylpropylperoxyisopropylmonocarbonate, 1,1,3,3-tetramethylbutylperoxy isononanate, 1,1,2-trimethylpropylperoxy-isononanate, and t-butylperoxybenzoate.

Examples of the inorganic peroxide include persulfates such as sodium persulfate, potassium persulfate, and ammonium persulfate; hydrogen peroxide; potassium permanganate; bromate such as sodium bromate and potassium bromate; perborates such as sodium perborate, potassium perborate, and ammonium perborate; percarbonates such as sodium percarbonate, potassium percarbonate, and ammonium percarbonate; superphosphates such as sodium superphosphate, potassium superphosphate, and ammonium superphosphate; and preferably, persulfate is used, more preferably, potassium persulfate and ammonium persulfate are used, even more preferably, ammonium persulfate is used.

These polymerization initiators can be used singly, or can be used in combination of two or more.

For the polymerization initiator, an azo-based compound can also be used.

For the azo-based compound, for example, 2,2'-azobisisobutyronitrile, 2,2'-azobis(2-methylpropioneamidine), and their salts can be used.

For the polymerization initiator, preferably, an inorganic peroxide is used, more preferably, persulfate is used, even more preferably, ammonium persulfate is used.

By using persulfate as the polymerization initiator, that is, by copolymerizing the polymer component in the presence of persulfate, the viscosity of the acrylamide-based polymer can be kept low, and a papermaking chemical having excellent handleability can be provided.

The mixing ratio of the polymerization initiator relative to 100 parts by mass of the total amount of the polymer component is, for example, 0.01 parts by mass or more, preferably 0.05 parts by mass or more, and for example, 10 parts by mass or less, preferably 5 parts by mass or less.

Examples of the solvent include water, and a solvent that is miscible with water such as the following: ketone-based solvents such as acetone and methyl ethyl ketone; monohydric alcohol-based solvents such as methanol, ethanol, propanol, isopropanol, and butanol; glycol ether-based solvents such as ethylene glycol monoethyl ether and propylene glycol monomethyl ether; and an ester ether-based solvent such as propylene glycol monomethyl ether acetate. Preferably, water is used. When tap water is used as the solvent, a chelating agent (ethylenediaminetetraacetic acid, etc.) can be mixed at a suitable ratio to remove metal.

These solvents may be used singly or in combination of two or more.

The mixing ratio of the solvent is not particularly limited, but is set suitably in accordance with the purpose and application.

Furthermore, in this method, along with the above-described polymer component, polymerization initiator, and solvent, a chain transfer agent (excluding (meth)allylsulfonic acid salt) can also be suitably blended.

Examples of the chain transfer agent include isopropyl alcohol, and mercaptos (e.g., mercaptoethanol, thiourea, thioglycolic acid, mercaptopropionic acid, thiosalicylic acid, thiolactic acid, aminoethanethiol, thioglycerol, thiomalic acid, etc.).

These chain transfer agents may be used singly or in combination of two or more.

The mixing ratio of the chain transfer agent relative to a total molarity of the polymer component is, for example, 0.05 mol % or more, preferably 0.1 mol % or more, and for example, 10 mol % or less, preferably 5 mol % or less.

The polymerization conditions in production of the acrylamide-based polymer are different depending on the types of the polymer component, polymerization initiator, and solvent, but the polymerization temperature is, for example, 30° C. or more, preferably 50° C. or more, and for example, 100° C. or less, preferably 95° C. or less.

The polymerization time is, for example, 0.5 hours or more, preferably 1 hour or more, and for example, 24 hours or less, preferably 12 hours or less. The polymerization reaction is terminated by addition of a known polymerization terminator (e.g., sodium sulfite, etc.).

The pH of the reaction solution at the time of polymerization is, for example, 1 or more, preferably 2 or more, and for example, 6 or less, preferably 5 or less. The pH can be adjusted by adding a known acid such as hydrochloric acid, sulfuric acid, and phosphoric acid.

With such a polymerization reaction, a solution of acrylamide-based polymer can be produced.

The solution of the acrylamide-based polymer has a concentration of, for example, 10 mass % or more, preferably 20 mass % or more, and for example, 50 mass % or less, preferably 45 mass % or less.

The acrylamide-based polymer has a weight-average molecular weight of, for example, 1500000 or more, preferably 3000000 or more, and for example, 15000000 or less, preferably 10000000 or less.

The weight-average molecular weight of the acrylamide-based polymer can be adjusted suitably, for example, by the type and the blending amount of the polymer component.

The weight-average molecular weight is measured in conformity with Examples to be described later.

The acrylamide-based polymer has a viscosity (nonvolatile component (solid content) 20 mass % (25° C.)) of, for example, 100 mP·s or more, preferably 1000 mP·s or more, and for example, 50000 mP·s or less, preferably 20000 mP·s or less.

The viscosity is measured in conformity with Examples to be described later.

Such an acrylamide-based polymer does not contain either the crosslinkable monomer containing nitrogen or tertiary amino-based monomer as the polymer component, and therefore when it is used for production of paper, paper strength can be increased and the (meth)acrylamide content in the paper product can be decreased excellently.

Therefore, the above-described acrylamide-based polymer is suitably used as a paper strength agent for paper used in various industrial fields, and in particular, suitably used as a paper strength agent for food wrapping paper.

The present invention includes a paper strength agent containing the above-described acrylamide-based polymer. To be specific, the paper strength agent of the present invention contains the above-described acrylamide-based polymer.

To produce the paper strength agent, for example, the above-described acrylamide-based polymer is blended with water, and the acrylamide-based polymer is dispersed by a known dispersion method.

The acrylamide-based polymer is dispersed in water, for example, by mixing water with the acrylamide-based polymer, and dispersing the acrylamide-based polymer by a known dispersion method such as mechanical dispersion using a dispersion device.

For the dispersion device used for the mechanical dispersion, for example, a known mixer, ultrasonic homogenizer, and high-pressure homogenizer are used. The dispersion conditions are not particularly limited, and are set suitably in accordance with the type of the device.

Furthermore, for example, by synthesizing the acrylamide-based polymer in water, the acrylamide-based polymer can be dispersed in water.

That is, the acrylamide-based polymer is synthesized in water by the above-described method, and the produced aqueous solution of the acrylamide-based polymer can be used as is as the paper strength agent.

The paper strength agent has an acrylamide-based polymer concentration of, for example, 10 mass % or more, preferably 20 mass % or more, and for example, 50 mass % or less, preferably 45 mass % or less.

In the paper strength agent, the above-described acrylamide-based polymer is used, and therefore paper strength can be increased and the (meth)acrylamide content in the paper product can be decreased excellently.

To be more specific, the above-described paper strength agent is added to a pulp slurry, and the mixture is subjected to wet paper-making, thereby producing paper. The wet paper-making method is not particularly limited and a known method can be used, and can be applied in various paper making, including acidic paper in which aluminum sulfate is used as a fixing agent, and neutralized paper in which calcium carbonate is used as a filler. The paper produced by the wet paper-making is used for newspaper, inkjet paper, thermal recording paper, pressure sensitive recording paper, high-quality paper, paperboard, coated paper, household paper, and other paper.

The mixing ratio of the paper strength agent (acrylamide-based polymer) relative to the pulp slurry is not particularly limited. For example, the acrylamide-based polymer relative to 100 parts by mass of the pulp slurry is, for example, 0.001 parts by mass or more, preferably 0.005 parts by mass or more, and for example, 5.0 parts by mass or less, preferably 2.0 parts by mass or less.

The paper strength of the thus produced paper is excellently increased, and the (meth)acrylamide content is decreased, and therefore the thus produced paper is suitably used for food wrapping paper.

To be specific, the (meth)acrylamide content in the paper is, for example, 0.2 ppm or less, preferably 0.1 ppm or less, as a value obtained by extracting the (meth)acrylamide in conformity with Examples to be described later, and converting the value to the extracted amount of the (meth)acrylamide per the mass of the paper.

EXAMPLES

The present invention is described in further detail in the following with reference to Examples and Comparative Examples, but the present invention is not limited thereto. The "parts" and "%" are based on mass unless otherwise specified. The specific numeral values such as the mixing ratio (content), physical property values, and parameters used in the description below can be replaced with the upper limit value (numeral values defined as "or less", "less than") or lower limit value (numeral values defined as "or more", "more than") of the corresponding mixing ratio (content), physical property values, and parameters shown in the above-described "DESCRIPTION OF EMBODIMENTS".

Example 1

As a portion of the polymer component, 70 mol % of the total amount of the polymer component to be charged shown in Table 1 was prepared, and diluted with tap water so that the concentration was 30 mass %.

Then, the produced solution was introduced into a 500 mL separable flask.

Then, sulfuric acid was added to the solution, and the pH was adjusted to about 2.5.

Thereafter, while blowing nitrogen to the solution, at 60° C., ammonium persulfate (APS) as the polymerization initiator was dropped, thereby causing polymerization. After 5 minutes from reaching the highest temperature (95° C.) based on the increase in the temperature from the polymerization, the remaining portion (30 mol %) of the polymer component was dropped.

Then, after completing the dropping of the remaining portion of the above-described polymer component, ammonium persulfate (APS) as the polymerization initiator was added until reaching a suitable viscosity (about 10000 mPa·s), and the reaction was allowed to continue at around 85° C.

Thereafter, $Na_2SO_3$ as the polymerization terminator (reducing agent) and dilution water were added and the mixture was cooled, thereby producing an aqueous solution of acrylamide-based polymer.

The aqueous solution had a solid content concentration of 21.9 mass % and a pH of 4.50.

The viscosity of the aqueous solution at 25° C. and the weight-average molecular weight (Mw) of the acrylamide-based polymer were measured with the following method. The results are shown in Table 1.

Furthermore, the amount of the free acrylamide remaining in the aqueous solution was obtained as the proportion relative to the total amount of the solid content (acrylamide-based polymer) with the following method. The results are shown in Table 1.

<Measurement of Viscosity at 25° C.>

Using type B viscometer (rotor No. 3.12 rpm)(type TVB-10 viscometer manufactured by TOKI Sangyo Co., Ltd.), the viscosity at 25° C. was measured in conformity with JIS K 7117-1 (1999).

<Measurement of Weight-Average Molecular Weight (Mw) with Gel Permeation Chromatography>

A sample was dissolved in a phosphoric acid buffer solution with a pH of 7, and setting the viscosity of the sample to 1.0 g/L, the weight-average molecular weight (Mw) was measured with gel permeation chromatography (GPC). From the obtained chromatogram (chart), the weight-average molecular weight (Mw) of the sample was calculated. The measurement device and measurement conditions are shown below.

Detector: product number TDA-302 (manufactured by Viscotek)
Column: product number TSKgel $GMPW_{XL}$ (manufactured by Tosoh Corporation)
Mobile phase: phosphoric acid buffer solution
Column flow rate: 0.8 mL/min
Sample concentration: 1.0 g/L
Injection amount: 500 μL <Remaining Acrylamide Amount>

First, 0.1 mass % of aqueous solution of phosphoric acid was added to the produced aqueous solution of acrylamide-based polymer to be diluted to 5 mg/mL, and thereafter, filtration was conducted with a 1 μm membrane filter, thereby preparing a measurement sample solution.

Then, 100 mg of the acrylamide sample (>98.0%, Tokyo Chemical Industry Co., Ltd.) was weighed with an electronic scale, and set to a volume with a 1 L volumetric flask. The obtained solution (acrylamide: 100 mg/L) was adjusted using a volumetric flask and a whole pipette to 10.0 mg/L, 1.0 mg/L, 0.5 mg/L, 0.1 mg/L, and 0.05 mg/L, thereby preparing standard samples.

Using the standard samples, acrylamide was analyzed with the high performance liquid chromatograph (HPLC) analyzer and the measurement conditions shown below. A calibration curve was obtained with an absolute calibration method.

Thereafter, using the measurement sample solution prepared as described above, analysis was conducted with the high performance liquid chromatograph (HPLC) analyzer and measurement conditions shown below, and the remaining acrylamide concentration [mg/L] contained in the aqueous solution of the acrylamide-based polymer was obtained from the calibration curve.

Device: high performance liquid chromatograph Chromaster (manufactured by Hitachi High-Technologies Corporation)
Column: LaChrom C 18-AQ (5 μm)(manufactured by Hitachi High-Technologies Corporation)
Guard column: LaChrom C 18-AQ (5 μm)-G (manufactured by Hitachi High-Technologies Corporation)

Detection wavelength: 220 nm
Temperature: 40° C.
Eluent: ultrapure water
Flow rate: 1.00 mL/min Examples 2 to 13 and Comparative Examples 1 to 21

An aqueous solution of the acrylamide-based polymer was produced in the same manner as in Example 1, except that the mixing formulation shown in Tables 1 to 5 was used. Isopropanol as the chain transfer agent was blended with the polymer component.

The viscosity of the aqueous solution at 25° C. and the weight-average molecular weight (Mw) of the acrylamide-based polymer were measured in the same manner as in Example 1. Furthermore, the amount of the free acrylamide remaining in the aqueous solution was determined in the same manner as in Example 1. The results are shown in Tables 1 to 5.

TABLE 1

| | | | | | | No. | | | |
|---|---|---|---|---|---|---|---|---|---|
| | | | | Ex. 1 | Ex. 2 | Ex. 3 | Ex. 4 | Ex. 5 | Ex. 6 |
| Mixing formulation | Polymerization component [mol %] | Acrylamide | AM | 91.70 | 94.45 | 91.70 | 91.70 | 91.70 | 89.90 |
| | | Quaternary ammonium-based monomer | DM-BQ | 5.50 | 2.75 | — | — | 5.50 | 5.50 |
| | | | DA-BQ | — | — | 5.50 | — | — | — |
| | | | DMC | — | — | — | 5.50 | — | — |
| | | | DMAPAA-Q | — | — | — | — | — | — |
| | | | DADMAC | — | — | — | — | — | — |
| | | Tertiary amino-based monomer | DM | — | — | — | — | — | — |
| | | | DMAPAA | — | — | — | — | — | — |
| | | Anionic polymerizable monomer | IA | 1.80 | 1.80 | 1.80 | 1.80 | 1.80 | — |
| | | | AA | — | — | — | — | — | 3.60 |
| | | Nitrogen-containing crosslinkable monomer | DMAA | — | — | — | — | — | — |
| | | | MBAM | — | — | — | — | — | — |
| | | | Triacrylformal | — | — | — | — | — | — |
| | | Chain transfer agent | (Meth) allylsulfonic acid salt SMAS | 1.00 | 1.00 | 1.00 | 1.00 | 1.00 | 1.00 |
| | | | Isopropyl alcohol IPA | — | — | — | — | — | — |
| | Polymerization initiator | | Type | APS | APS | APS | APS | V-50 + APS mass ratio 1:1 | APS |
| Physical property | Aqueous solution | | Solid content [%] | 21.9 | 22.3 | 21.6 | 23.8 | 20.9 | 21.2 |
| | | | pH | 4.50 | 4.60 | 4.50 | 4.40 | 4.60 | 3.60 |
| | | | Viscosity [mPa · s] | 3150 | 13770 | 6170 | 10900 | 2700 | 8200 |
| | Acrylamide-based polymer | | Molecular weight [10000 Da] | 440 | 627 | 586 | 621 | 351 | 605 |
| | | | Remaining AM amount [ppm/total solid content amount] | 367 | 719 | 590 | 551 | 529 | 369 |
| Evaluation | | | AM amount relative to paper amount [ppm] | 0.07 | 0.07 | 0.07 | 0.05 | 0.06 | 0.05 |
| | | | IB [mJ] | 232 | 234 | 231 | 230 | 228 | 236 |

TABLE 2

| | | | | | | No. | | | |
|---|---|---|---|---|---|---|---|---|---|
| | | | | Ex. 7 | Ex. 8 | Ex. 9 | Ex. 10 | Ex. 11 | Ex. 12 | Ex. 13 |
| Mixing formulation | Polymerization component [mol %] | Acrylamide | AM | 91.70 | 91.70 | 84.70 | 85.80 | 93.50 | 93.50 | 93.50 |
| | | Quaternary ammonium-based monomer | DM-BQ | — | — | — | — | 5.50 | — | — |
| | | | DA-BQ | — | — | 8.25 | — | — | — | — |
| | | | DMC | — | — | — | — | — | — | — |
| | | | DMAPAA-Q | 5.50 | — | 2.75 | 1.00 | — | 5.50 | — |
| | | | DADMAC | — | 5.50 | — | 10.00 | — | — | 5.50 |
| | | Tertiary amino-based monomer | DM | — | — | — | — | — | — | — |
| | | | DMAPAA | — | — | — | — | — | — | — |
| | | Anionic polymerizable monomer | IA | 1.80 | 1.80 | 3.60 | 0.90 | — | — | — |
| | | | AA | — | — | — | 1.80 | — | — | — |
| | | Nitrogen-containing crosslinkable monomer | DMAA | — | — | — | — | — | — | — |
| | | | MBAM | — | — | — | — | — | — | — |
| | | | Triacrylformal | — | — | — | — | — | — | — |

TABLE 2-continued

| | | | Ex. 7 | Ex. 8 | Ex. 9 | Ex. 10 | Ex. 11 | Ex. 12 | Ex. 13 |
|---|---|---|---|---|---|---|---|---|---|
| | Chain transfer agent | (Meth) allylsulfonic acid salt SMAS | 1.00 | 1.00 | 0.70 | 0.50 | 1.00 | 1.00 | 1.00 |
| | | Isopropyl alcohol IPA | — | — | — | — | — | — | — |
| | Polymerization initiator | Type | APS | APS | APS | APS | APS | APS | APS |
| Physical property | Aqueous solution | Solid content [%] | 22.4 | 22.8 | 21.5 | 22.5 | 21.9 | 21.4 | 20.1 |
| | | pH | 4.4 | 4.4 | 4.2 | 3.9 | 3.2 | 3.1 | 3.1 |
| | | Viscosity [mPa·s] | 7960 | 13950 | 9400 | 4230 | 6900 | 4600 | 4500 |
| | Acrylamide-based polymer | Molecular weight [10000 Da] | 619 | 590 | 534 | 302 | 552 | 540 | 552 |
| | Remaining AM amount [ppm/total solid content amount] | | 242 | 257 | 603 | 488 | 462 | 302 | 354 |
| Evaluation | AM amount relative to paper amount [ppm] | | 0.03 | 0.005 | 0.03 | 0.01 | 0.16 | 0.13 | 0.10 |
| | IB [mJ] | | 230 | 235 | 229 | 232 | 228 | 230 | 234 |

TABLE 3

| | | | Comp. Ex. 1 | Comp. Ex. 2 | Comp. Ex. 3 | Comp. Ex. 4 | Comp. Ex. 5 |
|---|---|---|---|---|---|---|---|
| Mixing formulation | Polymerization component [mol %] | Acrylamide | AM | 91.70 | 91.70 | 91.70 | 91.70 | 91.70 |
| | | Quaternary ammonium-based monomer | DM-BQ | 1.00 | 2.75 | 4.50 | 5.00 | 5.40 |
| | | | DA-BQ | — | — | — | — | — |
| | | | DMC | — | — | — | — | — |
| | | | DMAPAA-Q | — | — | — | — | — |
| | | | DADMAC | — | — | — | — | — |
| | | Tertiary amino-based monomer | DM | 4.50 | 2.75 | 1.00 | 0.50 | 0.10 |
| | | | DMAPAA | — | — | — | — | — |
| | | Anionic polymerizable monomer | IA | 1.80 | 1.80 | 1.80 | 1.80 | 1.80 |
| | | | AA | — | — | — | — | — |
| | | Nitrogen-containing crosslinkable monomer | DMAA | — | — | — | — | — |
| | | | MBAM | — | — | — | — | — |
| | | | Triacrylformal | — | — | — | — | — |
| | | Chain transfer agent | (Meth) allylsulfonic acid salt SMAS | 1.00 | 1.00 | 1.00 | 1.00 | 1.00 |
| | | | Isopropyl alcohol IPA | — | — | — | — | — |
| | Polymerization initiator | Type | | APS | APS | APS | APS | APS |
| Physical property | Aqueous solution | Solid content [%] | | 22.0 | 22.2 | 21.4 | 21.6 | 21.5 |
| | | pH | | 4.00 | 4.30 | 4.60 | 4.50 | 4.50 |
| | | Viscosity [mPa·s] | | 9180 | 9840 | 6220 | 3040 | 5450 |
| | Acrylamide-based polymer | Molecular weight [10000 Da] | | 624 | 560 | 562 | 459 | 592 |
| | Remaining AM amount [ppm/total solid content amount] | | | 403 | 393 | 243 | 504 | 298 |
| Evaluation | AM amount relative to paper amount [ppm] | | | 1.16 | 1.14 | 0.65 | 0.48 | 0.29 |
| | IB [mJ] | | | 230 | 235 | 232 | 231 | 234 |

TABLE 3-continued

|  |  |  |  | Comp. Ex. 6 | Comp. Ex. 7 | Comp. Ex. 8 | Comp. Ex. 9 | Comp. Ex. 10 |
|---|---|---|---|---|---|---|---|---|
| Mixing formulation | Polymerization component [mol %] | Acrylamide | AM | 91.69 | 91.70 | 92.70 | 91.69 | 92.70 |
|  |  | Quaternary ammonium-based monomer | DM-BQ | 5.50 | 5.50 | 5.50 | 5.50 | — |
|  |  |  | DA-BQ | — | — | — | — | — |
|  |  |  | DMC | — | — | — | — | — |
|  |  |  | DMAPAA-Q | — | — | — | — | — |
|  |  |  | DADMAC | — | — | — | — | 5.50 |
|  |  | Tertiary amino-based monomer | DM | — | — | — | — | — |
|  |  |  | DMAPAA | — | — | — | — | — |
|  |  | Anionic polymerizable monomer | IA | 1.80 | 1.80 | 1.80 | 1.80 | 1.80 |
|  |  |  | AA | — | — | — | — | — |
|  |  | Nitrogen-containing crosslinkable monomer | DMAA | — | — | — | — | — |
|  |  |  | MBAM | 0.015 | 0.003 | — | — | — |
|  |  |  | Triacrylformal | — | — | — | 0.015 | — |
|  |  | Chain transfer agent | (Meth)allylsulfonic acid salt SMAS | 1.00 | 1.00 | — | 1.00 | — |
|  |  |  | Isopropyl alcohol IPA | — | — | 3.00 | — | 3.00 |
|  | Polymerization initiator | | Type | APS | APS | APS | APS | APS |
| Physical property | Aqueous solution | | Solid content [%] | 22.1 | 21.2 | 20.4 | 21.2 | 20.4 |
|  |  |  | pH | 4.30 | 4.40 | 4.40 | 4.40 | 4.40 |
|  |  |  | Viscosity [mPa·s] | 4360 | 5350 | 800 | 5350 | 800 |
|  | Acrylamide-based polymer | | Molecular weight [10000 Da] | 600 | 624 | 35 | 624 | 35 |
|  |  |  | Remaining AM amount [ppm/total solid content amount] | 18257 | 563 | 263 | 563 | 263 |
| Evaluation |  |  | AM amount relative to paper amount [ppm] | 0.61 | 0.23 | 0.30 | 0.60 | 0.30 |
|  |  |  | IB [mJ] | 227 | 230 | 191 | 230 | 191 |

TABLE 4

|  |  |  |  | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|---|
| Mixing formulation | Polymerization component [mol %] | Acrylamide | AM | 91.40 | 88.02 | 88.82 | 86.22 | 88.02 | 88.02 |
|  |  | Quaternary ammonium-based monomer | DM-BQ | 1.00 | — | — | — | — | 9.00 |
|  |  |  | DA-BQ | — | — | — | — | — | — |
|  |  |  | DMC | — | — | — | — | — | — |
|  |  |  | DMAPAA-Q | — | — | — | — | — | — |
|  |  |  | DADMAC | — | — | — | — | — | — |
|  |  | Tertiary amino-based monomer | DM | 4.50 | 9.00 | 9.00 | 9.00 | — | — |
|  |  |  | DMAPAA | — | — | — | — | 9.00 | — |
|  |  | Anionic polymerizable monomer | IA | 1.80 | 1.80 | 1.80 | — | 1.80 | 1.80 |
|  |  |  | AA | — | — | — | 3.60 | — | — |
|  |  | Nitrogen-containing crosslinkable monomer | DMAA | 0.30 | 0.80 | — | 0.80 | 0.80 | 0.80 |
|  |  |  | MBAM | — | — | — | — | — | — |
|  |  |  | Triacrylformal | — | — | — | — | — | — |
|  |  | Chain transfer agent | (Meth)allylsulfonic acid salt SMAS | 1.00 | 0.38 | 0.38 | 0.38 | 0.38 | 0.38 |
|  |  |  | Isopropyl alcohol IPA | — | — | — | — | — | — |
|  | Polymerization initiator | | Type | APS | APS | APS | APS | APS | APS |

TABLE 4-continued

| | | | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|
| Physical property | Aqueous solution | Solid content [%] | 22.6 | 21.2 | 20.8 | 20.5 | 20.7 | 21.4 |
| | | pH | 3.64 | 3.68 | 3.65 | 2.83 | 4.00 | 4.60 |
| | | Viscosity [mPa·s] | 11700 | 9000 | 1740 | 8930 | 9650 | 2160 |
| | Acrylamide-based polymer | Molecular weight [10000 Da] | 643 | 390 | 100 | 355 | 451 | 322 |
| | Remaining AM amount [ppm/total solid content amount] | | 600 | 47 | 230 | 368 | 417 | 298 |
| Evaluation | AM amount relative to paper amount [ppm] | | 1.61 | 6.66 | 1.11 | 4.41 | 101.67 | 0.85 |
| | IB [mJ] | | 205 | 229 | 198 | 226 | 230 | 227 |

TABLE 5

| | | | | Comp. Ex. 17 | Comp. Ex. 18 | Comp. Ex. 19 | Comp. Ex. 20 | Comp. Ex. 21 |
|---|---|---|---|---|---|---|---|---|
| Mixing formulation | Polymerization component [mol %] | Acrylamide | AM | 93.42 | 93.42 | 94.50 | 92.50 | 92.70 |
| | | Quaternary ammonium-based monomer | DM-BQ | — | — | — | — | — |
| | | | DA-BQ | — | — | — | — | — |
| | | | DMC | — | — | — | — | — |
| | | | DMAPAA-Q | — | — | — | — | — |
| | | | DADMAC | 5.50 | 5.50 | 5.50 | 5.50 | 5.50 |
| | | Tertiary amino-based monomer | DM | — | — | — | 1.00 | — |
| | | | DMAPAA | — | — | — | — | — |
| | | Anionic polymerizable monomer | IA | — | — | — | — | — |
| | | | AA | — | — | — | — | — |
| | | Nitrogen-containing crosslinkable monomer | DMAA | 0.80 | — | — | — | — |
| | | | MBAM | — | 0.02 | — | — | — |
| | | | Triacrylformal | — | — | — | — | 0.01 |
| | | Chain transfer agent | (Meth) allylsulfonic acid salt SMAS | 1.00 | 1.00 | — | 1.00 | 1.00 |
| | | | Isopropyl alcohol IPA | — | — | 2.50 | — | — |
| | Polymerization initiator | Type | | APS | APS | APS | APS | APS |
| Physical property | Aqueous solution | Solid content [%] | | 21.5 | 21.1 | 20.1 | 20.5 | 22.0 |
| | | pH | | 3.40 | 3.20 | 3.10 | 3.80 | 3.20 |
| | | Viscosity [mPa·s] | | 8100 | 2860 | 3650 | 7240 | 2430 |
| | Acrylamide-based polymer | Molecular weight [10000 Da] | | 428 | 205 | 29 | 497 | 182 |
| | Remaining AM amount [ppm/total solid content amount] | | | 221 | 1953 | 87 | 271 | 854 |
| Evaluation | AM amount relative to paper amount [ppm] | | | 10.58 | 2.88 | 0.52 | 3.02 | 2.26 |
| | IB [mJ] | | | 232 | 217 | 189 | 224 | 213 |

The abbreviations in Tables are described below.
(Quaternary Ammonium-Based Monomer)
DM-BQ: quaternized salt of dimethylaminoethylmethacrylate with benzyl chloride
DA-BQ: quaternized salt of dimethylaminoethylacrylate with benzyl chloride
DMC: quaternized salt of dimethylaminoethylmethacrylate with methyl chloride
DMAPAA-Q: quaternized salt of dimethylaminopropylacrylamide with methyl chloride
DADMAC: diallyldimethylammoniumchloride
(Tertiary Amino-Based Monomer)
DM: dimethylaminoethylmethacrylate (tertiary cation)
DMAPAA: dimethylaminopropylacrylamide (tertiary cation)
(Anionic Polymerizable Monomer)
IA: itaconic acid
AA: acrylic acid
(Nitrogen-Containing Crosslinkable Monomer)
DMAA: N,N'-dimethylacrylamide
MBAM: methylenebisacrylamide
((Meth) Acrylamide)
AM: acrylamide
((Meth) Allylsulfonic Acid Salt)
SMAS: Sodium Methallylsulfonate
(Chain Transfer Agent)
IPA: isopropanol
(Polymerization Initiator)
APS: ammonium persulfate
V-50: trade name V-50, 2,2'-azobis(2-methylpropioneamidine).dihydrochloride, manufactured by Wako Pure Chemical Industries, Ltd.
<Evaluation>
(1) Acrylamide Extraction Test
Paper was produced based on the following method using the aqueous solution of the acrylamide-based polymer produced in Examples and Comparative Examples.
A pulp raw material (bleached kraft pulp (BKP)(leaf bleached kraft pulp (LBKP)/needle bleached kraft pulp (NBKP)=50/50, Canadian standard freeness (CSF: drainage)=380 mL) was introduced in a 1 L stainless steel pipe, that is, in an amount of 12.5 g under absolute dry condition, and diluted with tap water so that the pulp slurry concentration was 3.0 mass %.

Then, the produced pulp slurry was stirred at 400 rpm, and after 1 minute from the start of stirring, aqueous solution of acrylamide-based polymer diluted to 1.2 mass % was added. The amount of the aqueous solution added was adjusted so that the solid content relative to the absolute dry pulp mass was 1.5 mass %.

After 2 minutes, the mixture was diluted with tap water (pH 6.5, total hardness 135 ppm) so that the pulp slurry concentration was 1.0 mass %. Stirring was stopped after 3 minutes, and the mixture was subjected to papermaking, thereby producing wet paper (200 g/m$^2$).

Thereafter, papermaking was conducted again in the same manner, the produced two sheets of wet paper were placed on top of the other, and pressed at a temperature of 50° C., and thereafter dried with a drum dryer at 110° C. for 8 minutes. The handmade paper (400 g/m$^2$) was produced in this manner.

The acrylamide amount contained in the paper was measured using the produced paper based on the following method.

That is, first, the sample paper was subjected to humidity adjustment in a thermostat room (23° C., 50%) over one night, and 10 g of the sample paper cut into a 1.5 cm×1.5 cm square was weighed in a 500 mL round-bottomed flask, and refluxed for 4 hours in a 100 mL methanol. The extract was produced in this manner.

Then, after collecting the extract, the remaining paper was washed with 25 mL methanol twice. Then, the washing liquid was collected, and mixed with the above-described extract.

Thereafter, methanol was distilled away with an evaporator while heating the extract to 35° C., thereby preparing an extraction sample. Then, 5 mL of aqueous solution of 0.1 mass % phosphoric acid was added to the dried and hard extraction sample to be dissolved again, and the mixture was filtered with a 1 μm membrane filter: this was used as a measurement sample solution (about 5 mL).

The acrylamide extraction amount (AM extracted amount) was determined by the following method using the measurement sample solution.

To be specific, first, 100 mg of acrylamide sample (>98.0%, Tokyo Chemical Industry Co., Ltd.) was weighed with an electronic scale, and set to a volume with a 1 L measuring flask. The produced solution (acrylamide: 100 mg/L) was adjusted to give an amount of 10.0 mg/L, 1.0 mg/L, 0.5 mg/L, 0.1 mg/L, and 0.05 mg/L using a measuring flask and a whole pipette, thereby preparing standard samples.

Then, using the prepared standard samples, acrylamide was analyzed with the high performance liquid chromatograph (HPLC) analyzer and measurement conditions shown below, and a calibration curve was obtained using the absolute calibration method.

Thereafter, using the above-described measurement sample solution, acrylamide was analyzed with the high performance liquid chromatograph (HPLC) analyzer and the measurement conditions shown below, and the acrylamide concentration [mg/L] was determined based on the calibration curve. From the result, the mass of the acrylamide (that is, acrylamide mass extracted from paper) contained in the measurement sample solution was determined based on the following formula.

The acrylamide mass in the measurement sample solution [mg] = acrylamide concentration [mg/L] measured with HPLC × amount of the measurement sample solution prepared [5 mL] × (1/1000)[L/mL]

Then, based on the following formula, the amount of acrylamide extracted per paper mass (acrylamide extraction amount relative to paper mass) was calculated.

acrylamide extraction amount [ppm] relative to paper mass = acrylamide mass [mg] in measurement sample solution/paper mass [10000 mg] × 1000000

Device: High performance liquid chromatograph Chromaster (manufactured by Hitachi High-Technologies Corporation)
Column: LaChrom C 18-AQ (5 μm)(manufactured by Hitachi High-Technologies Corporation)
Guard column: LaChrom C 18-AQ (5 μm)-G (manufactured by Hitachi High-Technologies Corporation)
Detection wavelength: 220 nm
Temperature: 40° C.
Eluent: ultrapure water
Flow rate: 1.00 mL/min
The results are shown in Tables 1 to 5.
(2) Paper Strength Paper was produced based on the following method using the aqueous solution of the acrylamide-based polymer produced in Examples and Comparative Examples.

First, a pulp raw material (bleached kraft pulp (BKP)(leaf bleached kraft pulp (LBKP)/needle bleached kraft pulp (NBKP)=50/50, Canadian standard freeness (CSF: drainage)=380 mL) was introduced in a 1 L stainless steel pipe, that is, in an amount of 6.25 g under absolute dry condition, and diluted with tap water so that the pulp slurry concentration was 3.0 mass %.

Then, the produced pulp slurry was stirred at 400 rpm, and after 1 minute from the start of stirring, aqueous solution of acrylamide-based polymer diluted to 1.2 mass % was added. The amount of the aqueous solution added was adjusted so that the solid content relative to the absolute dry pulp mass was 1.5 mass %.

After 2 minutes, the mixture was diluted with tap water (pH 6.5, total hardness 135 ppm) so that the pulp slurry concentration was 1.0 mass %. Stirring was stopped after 3 minutes, and the mixture was subjected to papermaking, thereby producing wet paper (100 g/m$^2$).

Thereafter, pressing was conducted at room temperature, and then drying was conducted with a drum dryer at 110° C. for 3 minutes. The handmade paper (100 g/m$^2$) was produced in this manner.

Paper strength was evaluated using the produced paper based on the following method. The results are shown in Tables 1 to 5.
(2-1) Internal Bond (IB)[mJ]

The internal bond (IB) of paper was measured based on No. 18-2 "paper and board paper-internal bond strength test method—part 2: internal bond testing method" of JAPAN TAPPI paper and pulp test method ed. 2000.

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The acrylamide-based polymer and the paper strength agent of the present invention are suitably used in production of paper in various industrial fields, and the paper of the present invention is suitably used for food wrapping paper.

The invention claimed is:

1. An acrylamide-based polymer comprising a polymer of a polymer component, wherein
   the polymer component includes
   (meth)acrylamide,
   a quaternary ammonium-based monomer, and
   (meth)allylsulfonic acid salt,
   but does not include either
   a crosslinkable monomer containing nitrogen, or
   a tertiary amino-based monomer, wherein
   the quaternary ammonium-based monomer includes diallyldimethylammonium chloride.

2. The acrylamide-based polymer according to claim 1, wherein
   the polymer component substantially consists of
   (meth)acrylamide,
   a quaternary ammonium-based monomer, and
   (meth)allylsulfonic acid salt.

3. The acrylamide-based polymer according to claim 1, wherein
   the polymer component further contains an anionic polymerizable monomer.

4. The acrylamide-based polymer according to claim 3, wherein
   the polymer component substantially consists of
   (meth)acrylamide,
   the quaternary ammonium-based monomer,
   (meth)allylsulfonic acid salt, and
   an anionic polymerizable monomer.

5. The acrylamide-based polymer according to claim 1, wherein
   the polymer component further contains another polymerizable monomer.

6. A paper strength agent comprising the acrylamide-based polymer according to claim 1.

7. A paper strength agent according to claim 6, used for feed wrapping paper.

8. A paper produced by using the paper strength agent comprising the acrylamide-based polymer according to claim 6.

* * * * *